Patented Jan. 17, 1950

2,494,867

UNITED STATES PATENT OFFICE 2,494,867

REMOVAL OF FLUORINE FROM ORGANIC MATERIALS

Frederick E. Frey, Bartlesville, Okla., assignor to Phillips Petroleum Company, a corporation of Delaware No Drawing. Application February 7, 1942, Serial No. 429,961

8 Claims. (Cl. 260—683.4)

This invention relates to the removal of fluorine from organic fluorine-containing materials, and more particularly to the recovery therefrom of hydrogen fluoride and a substantially fluorine-free hydrocarbon residue. Still more particularly, it relates to recovery of hydrogen fluoride from spent catalysts, sludges, kettle bottoms, and undesired by-products which result from processes in which fluorine, hydrogen fluoride, boron fluoride, or other compounds of fluorine are contacted with hydrocarbon materials.

Fluorine compounds are used as catalysts or as reagents in many important hydrocarbon-conversion processes, among which are the following: Catalytic alkylation to produce motor fuel, hydrofluorination of olefins to produce alkyl fluorides, polymerization of olefins, direct fluorination of saturated hydrocarbons, treatment of saturated hydrocarbons to remove unsaturated impurities, isomerization and reforming, and aromatization or cyclization of aliphatic compounds.

In such processes as these, wherein a fluorine compound is contacted with an organic material, there is produced, as a result of side reactions and secondary reactions, some fluoro-organic material other than the desired primary product. The proportion of this undesired material depends upon the particular process and the specific conditions of operation. Also, the nature of this material varies considerably; in general, however, the material comprises one or more hydrogen fluoride addition products of aromatics, olefins, diolefins and/or cycloolefins. The material is usually predominantly normally liquid, soluble in hydrogen fluoride, partly soluble in water, and partly soluble in hydrocarbons. It usually is separable from the catalyst and/or product by a distillation step, from which it is withdrawn as a kettle product.

For the sake of simplicity, but without excluding any fluoro-organic material of the above-mentioned general types from the scope of my invention, hydrofluoric acid alkylation may be considered as a typical example of the processes in which fluoro-organic material is obtained as a by-product.

In hydrofluoric acid alkylation—such as, for example, alkylation of isobutane with butylenes, wherein the butylenes are slowly fed into a rapidly agitated reaction mixture comprising hydrogen fluoride and isobutane to produce relatively higher-boiling hydrocarbons, especially isooctanes, for use as motor fuel—the hydrofluoric acid either may be continuously recycled without purification until it becomes inefficient as an alkylating catalyst, or may be purified at least in part before being recycled. The purification usually is by a distillation or fractionation step wherein substantially pure hydrogen fluoride is distilled overhead in condition for being recycled to the alkylation step, and a fraction comprising fluoro-organic material and sometimes small proportions of water, sulfur compounds, free hydrogen fluoride, and/or heavy hydrocarbons is withdrawn as a bottom product. In either case, the degraded acid, that is, the spent catalyst or the bottom fraction from the acid purification step, comprises substantial amounts of compounds containing organically combined fluorine. These materials in some instances have been roughly determined to be about fifty to seventy per cent hydrofluorinated aromatic and cyclic compounds, and thirty to fifty per cent fluoro-substituted aliphatic compounds. Small proportions of sulfur compounds, water, free hydrogen fluoride, and dissolved hydrocarbons may also be present.

The total proportion of this acid sludge produced in such alkylation processes is usually about one or two per cent by volume of the alkylate. This material is difficult to dispose of safely because of its corrosive properties and because of the danger of contaminating water supplies with fluorides. Furthermore, the fluorine in the acid sludge represents an appreciable part of the alkylation costs. Therefore, from the standpoints of the disposal problem and of the cost of hydrogen fluoride, it is highly desirable to recover completely all of the hydrogen fluoride from the fluoro-organic sludges from alkylation processes.

An object of this invention is to recover hydrogen fluoride from fluoro-organic materials. A further object of this invention is to remove substantially completely fluorine from fluorine-containing organic wastes or by-products, thereby obviating or simplifying disposal of such wastes. Further objects and advantages of my invention will be apparent in the following detailed description and illustrative examples of practicing the invention defined by the appended claims.

I have found a simple and inexpensive process for completely removing fluorine from fluoro-organic material, thereby producing substantially pure hydrogen fluoride and a useful fluorine-free organic oil. My process comprises briefly a heating step wherein fluorine is split out from the fluoro-organic material as hydrogen fluoride, followed by separation steps wherein the resulting hydrogen fluoride and the organic material are separated from each other. The reaction effected in the heating step may be exemplified by the following equations:

(1) $C_8H_{17}F \xrightarrow{heat} C_8H_{16} + HF$
 (fluoroctane)   (octene)   (hydrogen fluoride)

(2) 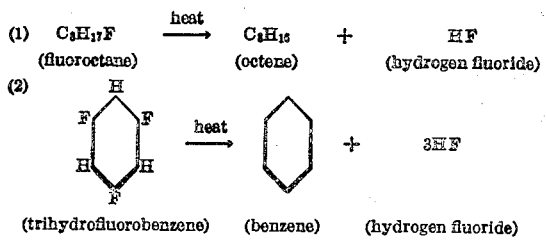

(trihydrofluorobenzene)   (benzene)   (hydrogen fluoride)

These two specific reactions do not necessarily play an important part in the process, but they serve to illustrate the general reactions wherein hydrogen fluoride is split out by the action of heat on molecules which contain hydrogen and fluorine atoms attached to adjacent carbon atoms. Indeed, it seems probable, in view of the relatively high boiling points of most fluorine-containing organic sludges, that the organo-fluoro-compounds contained therein are for the most part much more complex than fluoro-octane or trihydrofluorobenzene.

I have found that, in heating a complex fluoro-organic mixture, not all of the hydrogen fluoride is split out at one temperature. It is usually split out, at atmospheric pressure, in the temperature range 140° to 300° F. Usually all of the fluorine is split out if the material is subjected to a maximum temperature in the range 275° to 300° F. In some cases in which the fluoro-organic compounds are easily decomposed, a lower maximum temperature may be used; on the other hand, if unusually stable compounds are present, a higher temperature is required. Usually, however, the last of the fluoro-organic material decomposes, at atmospheric pressure, at about 275° F. If desired, the operation may be carried out at elevated pressures; however, higher temperatures are then required, and corrosion difficulties are enhanced; therefore, unless there is some specific reason in a particular instance, it is preferable to operate at atmospheric pressure. The reaction is rapid, and the hydrogen fluoride is ordinarily evolved as rapidly as the mixture is heated.

My invention may be operated as either a batch-type or a continuous process. In batch operation, a quantity of the fluorine-containing organic mixture is charged at atmospheric temperature to a suitable still or other heating chamber. The material is then gradually heated, as by a steam coil, in which case the available steam pressure should be fifty pounds gauge or more, or by an electric immersion heater or other suitable means. The rate of heating should be controlled so as not to cause excessive frothing and entrainment of liquid. Usually a period of from ten to sixty minutes is required, the longer times being used for materials which contain relatively large proportions of fluorine. Hydrogen fluoride is evolved from the mixture and passes overhead to a suitable condensing means. Some hydrocarbon material passes over with the hydrogen fluoride and may be separated out by suitable distillation and/or cooling and decanting steps. When the temperature of the material reaches 275° F., or such other similar temperature as has been determined by trial to be most desirable, the heating is stopped, and the residual organic material is drained from the kettle. A typical residual material is characterized as follows: Red-brown color; specific gravity, 0.888; refractive index (20° C.), 1.5013; unsaturation (cc. 1 per cent bromine per cc. sample), 34.9; sulfur, 2.17 per cent by weight; fluorine, 0.0013 per cent by weight. The material is largely aromatic, but includes some olefins, paraffins, and naphthenes. It is a satisfactory fuel oil and is suitable for the other common uses of aromatic oils of its type.

If it is desired to operate the process continuously, the feed is charged continuously to a suitable still or heating chamber in which the temperature is maintained at about 275° F. or other suitable temperature as determined by trial to be most desirable; the evolved hydrogen fluoride is withdrawn continuously overhead and is passed to suitable distillation or decantation steps for further purification, and the residual organic material is withdrawn from the still or heating chamber at a rate sufficient to maintain a constant liquid level therein. Preferably, the flow rates and the capacity of the heating chamber or still are so related that the heating time is in the range ten to sixty minutes. Shorter times usually result in excessive frothing and incomplete removal of fluorine, whereas longer times ordinarily are not advantageous because they reduce the capacity of the equipment.

A few of the many aspects of this invention are illustrated in the following examples, which are purely illustrative and not necessarily limitative of the invention.

*Example I*

Of a spent acid which had been used to catalyze the alkylation of isobutane with butylenes and propylene, 640 grams was charged to an evacuated steel distilling flask surrounded by a water bath at 110° F. and connected overhead to an evacuated receiving vessel cooled by Dry Ice. The system was allowed to stand overnight, whereupon 109 grams of condensate collected in the receiving flask. The condensate was found to contain 29.2 per cent by weight of hydrocarbons boiling in the range of butane to heptane, 49.1 per cent by weight or 53.5 grams of hydrogen fluoride, and 12.5 per cent by weight of relatively high-boiling hydrocarbon material which contained olefins and was insoluble in water.

The residue in the distilling flask amounted to 504 grams of material which was 50.4 per cent by weight soluble in water; the material lost during the distillation was 27 grams. Of this residue, 144 grams was further subjected to the action of heat in a distilling flask, and the following data were obtained:

| Kettle Temperature, °F. | Condensate Composition | | Accumulative Wt. Per Cent of Total Condensate |
|---|---|---|---|
| | Wt. Per Cent HF | Wt. Per Cent Hydrocarbon | |
| <155 | 86 | 14 | 27.2 |
| 155–159 | 94 | 6 | 56.3 |
| 159–217 | 92 | 8 | 85.2 |
| 217–270 | -- | -- | 96.9 |
| 217–498 | 68 | 32 | 100.0 |

The resulting condensate, of which 87.3 per cent by weight was hydrogen fluoride, was 46.1 per cent by weight of the 144-gram charge. The final residue remaining in the flask after this further treatment was found to have the following properties, which are typical of complex relatively high-boiling hydrocarbons comprising substantial proportions of aromatics.

Specific gravity (25° C.) =0.8881
Refractive index (20° C.) =1.5013
Cc. 1% $Br_2$/cc. residue=34.9
Sulfur, per cent by weight=2.17
Fluorine, per cent by weight=0.0013
Color=dark red to brown in transmitted light
Solubility in 98% $H_2SO_4$=80%
Aniline point=35° C.

The total recoverable hydrogen fluoride represented 40.1 per cent of the original spent acid. The recovered residual oil was substantially free of fluorine and was suitable for use as fuel oil.

*Example II*

In a process for alkylating isobutane with butylenes in the presence of concentrated hydrogen fluoride, the hydrogen fluoride is separated from the alkylate in a gravitational settling chamber. Nine-tenths of the used hydrogen fluoride is recycled directly to the alkylator, and one-tenth is passed to a fractionator wherein it is separated into a low-boiling fraction comprising nearly pure hydrogen fluoride that is recycled to the alkylator and into a residual fraction comprising substantial proportions of fluoro-organic compounds and small proportions of free hydrogen fluoride that is withdrawn from the kettle. This residual material is collected until about two hundred gallons have been obtained. It is then charged to a simple batch still which is heated by a steam coil. Steam is passed into the heating coil at such a rate that the kettle temperature rises about 4 or 5° F. per minute. A fraction comprising about 78 per cent hydrogen fluoride and 22 per cent hydrocarbons passes overhead and is condensed in a coil and receiver cooled by cold water. After about fifty minutes, when the kettle temperature has reached 275° F., the steam is turned off, and the products are withdrawn. A hydrocarbon layer which separates out on top of the condensate is withdrawn, and the recovered hydrogen fluoride, which amounts to 41.7 per cent by weight of the original charge to the still and which is substantially pure anhydrous hydrogen fluoride, is returned to the alkylator. The hydrocarbon from the kettle is mixed with similar material from other sources, and the mixture is used as fuel oil.

My invention provides for the recovery of hydrogen fluoride from organic fluorine-containing mixtures, and for producing a fluorine-free organic material suitable for use as fuel, thus at once solving a difficult disposal problem and recovering valuable materials. Although fluorine can be removed and recovered from fluoro-organic material by chemical methods such as hydrolysis and extraction with an alkali followed by concentration of the alkali fluoride and treatment with concentrated sulfuric acid, my method in comparison is obviously much cheaper, much simpler, and more rapid.

Although I have described my invention mainly from the viewpoint of recovering hydrogen fluoride from acid sludges formed in hydrofluoric acid alkylation processes, it is obviously applicable to the recovery and/or complete removal of fluorine as hydrogen fluoride from all fluoro-organic material of the types described, the essential characteristic of which is the occurrence of hydrogen and fluorine atoms upon adjacent carbon atoms in the molecule. The process may be operated as a separate process deriving raw material from any suitable source and disposing of the products in any manner, or it may be operated in combination with such a process as hydrofluoric acid alkylation, hydrofluorination of olefins, or the like, wherein spent acid or other fluoro-organic material is treated to recover hydrogen fluoride for recycling to the process.

From the foregoing, it is believed that the many advantages obtainable by the practice of the present invention will be readily apparent to persons skilled in the art. However, since certain changes may be made in carrying out the above method without departing from the scope of the invention, as defined by the appended claims, it is intended that all matter contained herein shall be interpreted as illustrative and explanatory, rather than in a limiting sense.

I claim:

1. In a process for the catalytic conversion of hydrocarbons in the presence of a hydrogen fluoride catalyst, the improvement which comprises separating from effluents of said conversion at least a portion of the used liquid hydrogen fluoride which contains dissolved fluorine-containing organic impurities, subjecting said portion to fractional distillation to separate purified hydrogen fluoride from liquid organic impurities and recovering said purified hydrogen fluoride, subjecting residual liquid fluorine-containing organic impurities to an elevated temperature to decompose the same, forming hydrogen fluoride, and recovering hydrogen fluoride so formed.

2. In a process for the catalytic conversion of hydrocarbons in the presence of a hydrogen fluoride catalyst, the improvement which comprises separating from effluents of said conversion at least a portion of the used liquid hydrogen fluoride containing dissolved fluorine-containing organic impurities, subjecting said portion to fractional distillation to separate purified hydrogen fluoride from liquid organic impurities and recovering said purified hydrogen fluoride, subjecting residual liquid fluorine-containing organic impurities to an elevated temperature to decompose the same forming hydrogen fluoride and substantially fluorine-free organic material, and recovering hydrogen fluoride so formed.

3. In a process for reacting isoparaffins with olefins to produce saturated branched chain hydrocarbons, in which a hydrocarbon mixture containing substantial proportions of said isoparaffins and said olefins is subjected to alkylation conditions in the presence of a hydrogen fluoride catalyst, the improvement which comprises separating from the effluent of said alkylation at least a portion of the used liquid hydrogen fluoride which contains dissolved fluorine-containing organic impurities, subjecting said portion to fractional distillation to separate purified hydrogen fluoride from liquid organic impurities and recovering said purified hydrogen fluoride, subjecting residual liquid fluorine-containing organic impurities to an elevated temperature to decompose the same, forming hydrogen fluoride, and recovering hydrogen fluoride so formed.

4. In a process for reacting isoparaffins with olefins to produce saturated branched chain hydrocarbons, in which a hydrocarbon mixture containing substantial proportions of said isoparaffins and said olefins is subjected to alkylation conditions in the presence of a hydrogen fluoride catalyst, the improvement which comprises separating from effluents of said alkylation at least a portion of the used liquid hydrogen fluoride containing dissolved fluorine-containing organic impurities, subjecting said portion to fractional distillation to separate purified hydrogen fluoride from liquid organic impurities and recovering said purified hydrogen fluoride, subjecting residual liquid fluorine-containing organic impurities to an elevated temperature to decompose the same forming hydrogen fluoride and substantially fluorine-free organic material, and recovering hydrogen fluoride so formed.

5. In a process for reacting isoparaffins with olefins to produce saturated branched chain hydrocarbons, in which a hydrocarbon mixture containing substantial proportions of said isoparaffins and said olefins is subjected to alkylation conditions in the presence of a hydrogen fluoride catalyst, the improvement which comprises separating from effluents of said alkylation at least a portion of the used liquid hydrogen fluoride containing dissolved fluorine-containing organic impurities, subjecting said portion to fractional distillation to separate purified hydrogen fluoride from liquid organic impurities and recovering said purified hydrogen fluoride, subjecting residual liquid fluorine-containing organic impurities to an elevated temperature within the range of 140 to 300° F. for a time sufficient to decompose the same forming hydrogen fluoride and substantially fluorine-free organic material, and recovering hydrogen fluoride so formed.

6. In a process for reacting isoparaffins with olefins to produce saturated branched chain hydrocarbons, in which a hydrocarbon mixture containing substantial proportions of said isoparaffins and said olefins is subjected to alkylation conditions in the presence of a hydrogen fluoride catalyst, the improvement which comprises separating from effluents of said alkylation at least a portion of the used liquid hydrogen fluoride containing dissolved fluorine-containing organic impurities, subjecting said portion to fractional distillation to separate purified hydrogen fluoride from liquid organic impurities and recovering said purified hydrogen fluoride, subjecting residual liquid fluorine-containing organic impurities to an elevated temperature not greater than about 498° F. for a time sufficient to decompose the same forming hydrogen fluoride and substantially fluorine-free organic material, and recovering hydrogen fluoride so formed.

7. A process for the alkylation of paraffinic hydrocarbons having a tertiary carbon atom with olefins which comprises contacting the paraffin with the olefin in the presence of an alkylating catalyst consisting essentially of hydrofluoric acid as its active ingredient in an alkylating zone, separating the used catalyst from unreacted hydrocarbons and alkylated product, regenerating the catalyst for reuse by distilling at least a portion of the separated catalyst by heating to a relatively low temperature, recovering the hydrogen fluoride vapor evolved from said distillation step, subjecting the unvaporized material from the distillation step to a second, separate distillation step by heating to a temperature in excess of about 150° C. to decompose the major portion of the organic fluorine compounds formed as a result of side reactions in the alkylating zone into hydrogen fluoride and complex organic compounds, recovering the hydrogen fluoride vapor evolved from said second distillation step, and recovering and returning hydrogen fluoride from said distillation step and said second distillation step to the alkylating zone.

8. A process for the alkylation of paraffinic hydrocarbons having a tertiary carbon atom with olefins which comprises contacting the paraffin with the olefin in the presence of an alkylating catalyst consisting essentially of hydrofluoric acid as its active ingredient in an alkylating zone, separating the used catalyst from unreacted hydrocarbons and alkylated product, distilling at least a portion of the separated catalyst by heating to a relatively low temperature, recovering the hydrogen fluoride vapor evolved from said distillation step, subjecting the unvaporized material from the distillation step to a second, separate distillation step by heating to a temperature in excess of about 150° C. to decompose the major portion of the organic fluorine compounds formed as a result of side reactions in the alkylating zone into hydrogen fluoride and complex organic compounds, and recovering the hydrogen fluoride vapor evolved from said second distillation step.

FREDERICK E. FREY.

REFERENCES CITED

The following references are of record in the file of this patent:

UNITED STATES PATENTS

| Number | Name | Date |
|---|---|---|
| 1,220,821 | Brooks et al. | Mar. 27, 1917 |
| 2,013,030 | Calcott et al. | Sept. 3, 1935 |
| 2,267,730 | Grosse et al. | Dec. 30, 1941 |
| 2,275,312 | Tinker | Mar. 3, 1942 |
| 2,288,580 | Baehr | June 30, 1942 |
| 2,320,629 | Matuszak | June 1, 1943 |
| 2,388,918 | Iverson | Nov. 13, 1945 |
| 2,436,695 | Kuhn, Jr. | Feb. 24, 1948 |

OTHER REFERENCES

Henne et al.: "Reactivity and Influence of Fluorine in Aliphatic Compounds," Chemical Abstracts, vol. 30, page 5175 (1936) (abstr. of article in Jour. Am. Chem. Soc., vol. 58, pages 882-4 (1936)).

Thorpe et al.: "Dictionary of Applied Chemistry," 4th edition, vol. V, page 281 (1 page), pub. Longmans, Green & Co. (1941).